Patented July 7, 1936

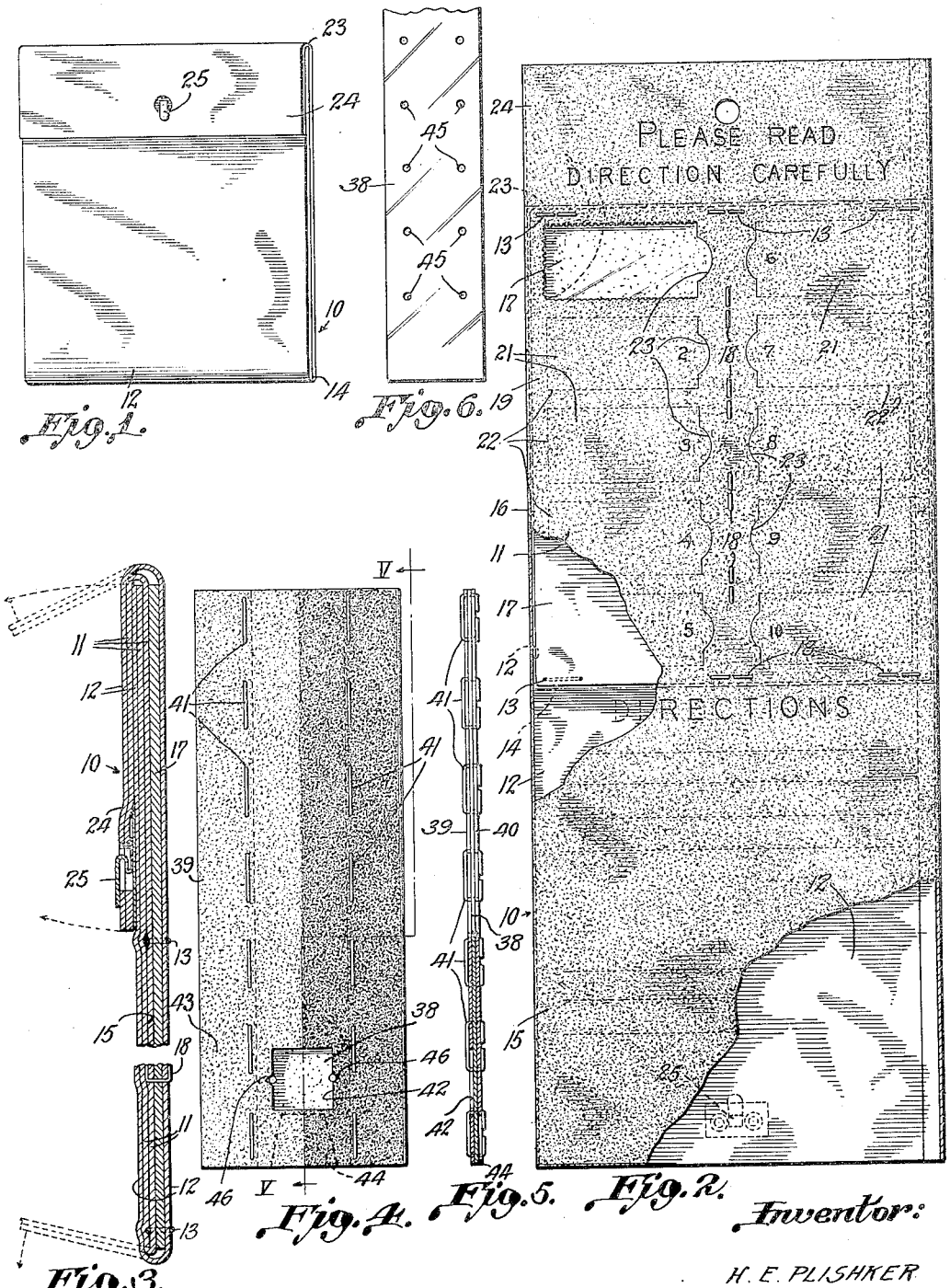

2,046,409

UNITED STATES PATENT OFFICE 2,046,409

LIGHT INTENSITY INDICATOR

Herbert E. Plishker, Flushing, N. Y., assignor to Westinghouse Lamp Company, a corporation of Pennsylvania Application August 8, 1934, Serial No. 738,959

10 Claims. (Cl. 95—10)

The present invention relates to a simple form of photometer for use in determining the intensity of artificial light emanating from a given source.

It is well understood that the average user of electric lamps, particularly incandescent electric lamps, has no convenient means for determining the intensity of light necessary for different purposes. Lamps are made of different wattages and it is more or less a matter of guess on the part of a user as to whether one or more lamps of selected wattages furnish light of adequate intensity for the illumination of a given sized room for example, or for a given purpose as when used for reading. Lamp manufacturers have endeavored to supply data along this line so that the purchaser might select lamps for proper economical illumination.

Charts have been employed giving the proper wattage lamps to be used under predetermined conditions. The many factors which enter into the problem such as position of the fixtures, size and reflective values of the room, etc., made any fixed data uncertain and it failed to give the necessary full information necessary for proper illumination.

The present invention contemplates the use of a light sensitive paper such as a bromide or any suitable medium which will change color when exposed to light, and in accordance with the present invention the change in color of a sensitive medium is compared with a photometric or colored surface. This surface is selected to match the color of the sensitized paper after the paper has been exposed to light for a predetermined time interval.

Means are provided whereby the fixed colored area is disposed for convenient comparison with a newly exposed portion of the light sensitive paper. The observer, by means of a watch or other time measuring device then notes the time which elapses and observes the color of the sensitive medium at the end of the selected time period. In this manner a determination of the intensity of the light may readily be obtained. The device may be prvoided with suitable data giving the time during which the sensitive medium should change to the color of the standard. If the color of the medium and the color of the standard match, the user may refer to the data chart and ascertain if the intensity of the light is sufficient or insufficient for the purpose intended.

Data may be supplied for different types of lamps, taking into consideration their position, wattage, the dimensions of the room, etc. It will be evident that, by the use of the sensitive medium compared with a standard photometric surface, after exposed for a given time interval, a quick and practical estimation of the intensity of the light falling on a given surface is available. Inasmuch as the device may be made at relatively low cost, and is simple to operate, it will be found useful by anyone wishing to use light of the proper intensity for a given purpose.

It is obvious that the present invention may be used for the measurement of light rays other than those constituting visible light. For example, the sensitive medium may be responsive to rays in the invisible band as for example ultra-violet radiations. A standard in the form of a surface of a predetermined color or a shade of black or white may be used so that when the sensitive medium is exposed to such invisible radiations for selected time intervals a comparison may be made to determine the intensity of the invisible rays.

It is an object of the present invention to provide a simple and effective device for determining the intensity of light emanating from a given source.

Another object of the invention is to provide a device whereby light intensity may be determined by the comparison of a varying color medium and a fixed color medium.

Another object of the invention is to arrange a medium capable of changing color adjacent to a selected color for convenient comparison after a given time interval.

Other objects and advantages of the invention will be understood by reference to the following description together with the accompanying drawing in which Fig. 1 is a front view of a pocket sized device constructed in accordance with the present invention and shown closed or folded;

Fig. 2 is a view of the device shown open and in position for use, portions being broken away for the sake of clearness;

Fig. 3 is a vertical cross sectional view of the device in a folded position;

Fig. 4 is a modification of the device in which a light sensitive strip of material is enclosed between two sheets and is slidable to expose different portions of the light sensitive surface;

Fig. 5 is a view taken on line V—V in Fig. 4; and

Fig. 6 is a fragmentary view showing a portion of light-sensitive material with apertures or perforations for the purpose of indexing to insure proper portions of the material being exposed.

The invention may be embodied in structures of various forms. The structures shown in the drawing have been selected for simplicity and low cost since the invention will find its most extensive use in homes, sales rooms and factories where there is need of a simple form of photometer.

As shown in Figs. 1 to 3, a practical embodiment of the invention may comprise a folder 10 of flexible sheet material such for example as paper. The folder may include a front sheet 11 and a rear sheet 12 of equal size suitably fastened together as by glue and by staples 13. The sheets may be folded at 14 to provide a portion 15 for inscriptions and a portion in the form of a pocket 16 to receive a sheet of sensitive material 17 which may be secured by paste or staples 18. A face 19 of the sheet 11 may be provided with tabs 21 outlined by perforations 22 and having lips 23. When a lip 23 is lifted and gripped between the fingers a tab, by reason of the weakened lines of frangible boundaries, may be torn off exposing the light-sensitive paper.

The surface of the sheet 11 may be colored to serve as a standard so that when the device is held with the sensitive paper exposed, the time taken for the exposed paper to change to the color of the standard may be noted and the intensity of the light determined by the time taken for the sensitive paper to match the standard.

The structure shown in Figs. 1 to 3 is made to fold at 14 and also at 23 to provide a flap 24. The device may thus be folded as shown in Fig. 1 and a clip and eyelet 25 serve to hold the parts closed for convenience in carrying. The entire device may be about the size of the usual bill fold and readily carried in the pocket.

Figs. 4, 5 and 6 show another form of the device in which a movable strip of sensitive material 38 is disposed between two sheet strips of paper or other flexible material 39 and 40 held together by paste or staples 41 so arranged as to leave a passage for the sensitive material 38. An aperture or window 42 is provided in strip 39 to expose a portion of the sensitive material and the surface 43 of the strip 39 may be colored to provide a standard photometric surface against which the color of the exposed material is compared and the time taken for the two colors to match is noted.

A notch 44 is provided so that after an exposure of one portion of the sensitive material it may be secured and drawn out to expose another portion. For the purpose of preventing the withdrawal of a greater portion of the light sensitive strip than is necessary, the strip is provided with perforations 45 which may be indexed with notches 46 provided on the border of the window 42.

It is to be understood that any light sensitive paper may be selected which, after exposure to light of a given intensity, will change to a definite color in a definite time interval and the photometric surface may be given this color.

If it is desired to determine the intensity of light falling on a desk or work bench for example, the device may be placed on the surface where the light is to be measured. A portion of the light sensitive medium is then exposed. The user then notes the length of time it takes for the sensitive paper to change to a color matching the photometric surface. If, according to the data given, the sensitive paper matches the photometric surface say in five minutes, it will indicate that the lighting is of sufficient intensity for average work. If a longer time interval is required it will indicate that the lighting is insufficient. If, however, the sensitive medium changes to the color of the photometric surface in less than the time specified it will indicate that the lighting is more than sufficient.

Although a preferred embodiment of the invention is shown and described herein it is to be understood that modifications may be made therein without departing from the spirit and scope of the invention as set forth in the appended claims.

What is claimed:

1. A light intensity indicating device comprising a sheet of light-sensitive material, an opaque covering for said material, said covering having a surface of a definite color, said covering having individually removable portions to expose portions of said material for comparison with said surface.

2. A light intensity indicating device comprising a sheet of light sensitive material, an opaque covering for said material, said covering having a surface of a definite color, said covering having portions with frangible boundaries for the individual removal of said portions to expose portions of said material for comparison with said surface.

3. A light intensity indicating device comprising a sheet of light sensitive material, a flexible casing of opaque sheet material enclosing said sensitive material, portions of said casing being outlined by perforations to facilitate the removal of said portion individually to expose portions of said sensitive material and a surface having a definite color value on said sheet convenient for comparison with exposed portions of said sensitive material.

4. A device for determining the intensity of light from a given source comprising a sheet of material having photometric surface provided with a plurality of apertures and a medium changeable in color value when exposed to light through said apertures to match said surface and means for exposing said surface through said apertures.

5. A device for determining the intensity of light rays from a given source comprising a medium changeable to a definite color value after exposure for a given time interval to light rays of given intensity, a sheet of material having a photometric surface having said color value disposed for convenient comparison with said medium, said surface having a plurality of apertures for the exposition of portions of said medium, means for normally shielding said portions from light rays, said means being removable to subject said portions to light rays.

6. A device for determining the intensity of light rays emanating from a given source comprising a medium changeable to a definite color value when exposed to light of a given intensity for a given time interval, an envelope for sealing said medium against exposure, a photometric surface on a surface of said envelope for convenient comparison with said medium, said envelope having a plurality of apertures in said surface, means for closing said apertures, said means being removable to individually open said apertures to expose a portion of said medium for comparison with said surface.

7. A device for determining the intensity of light rays emanating from a given source comprising a medium changeable to a definite color value when exposed to light of a given intensity for a given time interval, an envelope for sealing said medium against exposure, said envelope having a photometric surface, said envelope having apertures in said surface to expose portions of said medium for convenient comparison with said surface, opaque sheet material covering said apertures, said sheet being removable for exposing a portion of said medium for comparison with said surface.

8. A device for determining the intensity of light from a given source, a light sensitive medium, an enclosing envelope for said medium, said envelope having an aperture in the wall thereof for the exposure of said medium to light rays, means for closing said aperture to shield said medium from light rays, said means being removable for the exposition of said medium to light rays and a photometric surface adjacent to said aperture for comparison with the exposed portion of said medium.

9. A device for determining the intensity of light from a given source comprising a strip of light sensitive medium, a sheet of opaque material having a photometric surface covering said medium, said material having an aperture and a closure for said aperture, said closure being removable for the exposition of said medium to light rays.

10. A device for determining the intensity of light rays from a given source comprising a strip of light sensitive medium, a sheet of opaque material having a photometric surface covering said medium, said material having a plurality of apertures, means for closing said apertures, said means being removable for the individual exposure of a portion of said medium through an aperture for comparison with said photometric surface.

HERBERT E. PLISHKER.